US006173965B1

United States Patent
Niessen

(10) Patent No.: US 6,173,965 B1
(45) Date of Patent: Jan. 16, 2001

(54) ACTUATOR SEAL BEARING ASSEMBLY AND METHOD

(76) Inventor: Leopold J. Niessen, 83 Western Way, PO12 2NF Gosport (GB)

( * ) Notice: Under 35 U.S.C. 154(b), the term of this patent shall be extended for 0 days.

(21) Appl. No.: 09/221,790

(22) Filed: Dec. 28, 1998

(51) Int. Cl.$^7$ ................................. F16J 15/16; F16J 9/00
(52) U.S. Cl. .......................................... 277/584; 277/448
(58) Field of Search ..................................... 277/584, 448, 277/468

(56) References Cited

U.S. PATENT DOCUMENTS

| | | | | |
|---|---|---|---|---|
| 2,456,356 | * | 12/1948 | Aber | 277/584 |
| 2,494,598 | * | 1/1950 | Waring | 277/584 |
| 2,705,177 | * | 3/1955 | Waring | 277/438 |
| 2,760,794 | * | 8/1956 | Hartranft | 277/395 |
| 3,687,465 | * | 8/1972 | Grime et al. | 277/619 |
| 4,354,424 | * | 10/1982 | Nordlund | 92/69 R |
| 4,749,201 | * | 6/1988 | Hunger | 277/311 |
| 5,328,177 | * | 7/1994 | Lair et al. | 277/311 |
| 6,105,970 | * | 8/2000 | Siegrist et al. | 277/448 X |

\* cited by examiner

Primary Examiner—Anthony Knight
Assistant Examiner—Robert L. Pilaud
(74) Attorney, Agent, or Firm—Kenneth L. Nash

(57) ABSTRACT

A seal bearing assembly and method for a pneumatic actuator is provided for placement within a groove in an actuator piston. For maintaining a compact size of the piston, the piston preferably has only a single encircling piston groove. In accord with the present invention, a compressible seal and bearing ring are positioned adjacent each other within the single piston groove. The compressible seal ring and bearing ring are sized so that side-to-side movement is possible within the piston groove until the piston is inserted into the pneumatic actuator cylinder. Upon insertion of the piston, compression of the seal ring causes the diameter of the seal ring to expand within the piston groove thereby securing the seal bearing assembly into a fixed position that prevents side-to-side movement of the assembly. The bearing is preferably non-metallic and centralizes the piston within the actuator cylinder to prevent metal-to-metal contact, scoring, and resulting wear. The bearing ring has a lateral side adjacent to the compressible seal ring with a concave groove therein to receive and support the generally convex surface of the compressible seal ring. Preferably the radius of the arc, which may be circular, elliptical, hyperbolic or the like, of the concave groove of the bearing ring is less than the radius of the cross-section of the uncompressed seal ring. Compression of the seal ring distorts the uncompressed profile of the seal ring so that the cross-sectional profile of the compressed seal ring mates closely with the concave groove of the bearing ring. An opposite lateral side of the bearing ring preferably has a chamferred corner adjacent the bottom of the piston groove.

17 Claims, 2 Drawing Sheets

ACTUATOR SEAL BEARING ASSEMBLY AND METHOD

BACKGROUND OF THE INVENTION

1. Field of the Invention

The present invention relates generally to valve actuators and, more particularly, to apparatus and methods for an actuator seal bearing assembly.

2. Description of the Background

Pneumatic actuators for pneumatically controlling valves are used throughout industry for a wide variety of purposes. For some applications, it is highly desirable that the actuator be as compact as possible because physical space for the valve and actuator is quite limited.

An exemplary and highly compact configuration for a pneumatic actuator is shown in U.S. Pat. No. 4,354,424, issued Oct. 19, 1982, to Sven Nordlund, which is hereby incorporated herein by reference. In that actuator, each actuator piston is provided with a rack having teeth thereon to engage corresponding teeth of an operating element. The rack includes a recess for receiving a first spring that produces a return force on the piston. The recess extends substantially into the rack of the piston. A second shorter spring is provided within a central portion of each actuator piston. Thus, one spring in each piston is off-set from the center and is longer than the other spring. The offset, longer spring provides a solution to a basic problem of compact spring return actuators. Prior to this invention, such actuators did not consistently have sufficient spring force to completely close the valve. While the off-set spring is therefore very advantageous, when the actuator is operated under full or near full load over a large number of cycles, a very slight tilting of the actuator piston can occur that may cause scoring of the cylinder and reduce the lifetime operation of the actuator. While most control systems are designed with ample safety factors that place the actuator under a relatively light load, a particular system may be designed to require a higher load with a small actuator due to limited space. As well, a system component of any control system may change or malfunction and thereby place a higher load on the actuator until the problem is detected and then corrected. Thus, it would be very desirable to increase the reliability of the compact actuator for the circumstance of high loading with continuous cycling operation.

While it would be desirable to limit wear even under a maximum load scenario, there are constraints. It would be desirable to eliminate the wear without increasing the length of the piston. The extremely compact configuration of the exemplary actuator discussed above is another significant advantage of this design. Moreover, it would be desirable to provide a means to easily update existing actuators so that if and when they are operated at full or near full load, then the lifetime will be substantially as extensive as though it were operated at only a much smaller load. Those skilled in the art have long sought and will appreciate the present invention which addresses these and other problems.

SUMMARY OF THE INVENTION

The seal bearing assembly and method of the present invention ensures long actuator life with continuous cycling at full load capacity. The present invention is especially suitable for use in a short piston so as to provide a very compact actuator. Thus, the seal bearing assembly of the present invention may be used in a pneumatic actuator piston that is reciprocal within an actuator cylinder wherein the actuator cylinder has a cylindrical surface. The pneumatic actuator piston defines therein a piston groove that encircles the pneumatic actuator piston. The piston groove has a groove width and a bottom groove surface. The seal bearing assembly comprises in the first place a compressible seal ring for encircling the pneumatic actuator piston such that the compressible seal ring is mountable or insertable into the piston groove. The compressible seal ring is sealingly engagable between the bottom groove surface and the cylinder surface so as to provide a seal around the piston within the actuator cylinder. A preferably non-metallic and substantially non-compressible bearing ring is insertable for mounting within the piston groove adjacent the compressible seal ring so as to encircle the pneumatic actuator piston. The bearing ring is sized to engage the bottom groove surface and the cylinder surface such that the bearing ring extends slightly radially outwardly from the pneumatic actuator piston to thereby engage the cylinder surface. Thus, the bearing ring substantially centers the pneumatic actuator piston within the actuator cylinder to prevent metal-to-metal contact between the pneumatic actuator piston and the cylinder surface. The bearing has a lateral support side that is engageable with the compressible seal ring. The lateral support side defines therein a concave groove. The concave groove has a profile that substantially mates to an outline of the compressible ring seal formed after the compressible ring is compressed between the cylinder surface and the bottom groove surface. Thus the compressible seal ring has an uncompressed cross-sectional profile or diameter and a different compressed seal ring cross-sectional diameter wherein the diameter is measured substantially along the line parallel to the reciprocal movement of the pneumatic piston. The bearing ring also has a bearing ring cross-sectional diameter wherein the diameter is also measured substantially along the line parallel to the reciprocal movement of the pneumatic piston. Since the bearing ring is substantially non-compressible, the profile of the bearing ring does not change. The uncompressed cross-sectional diameter of the seal ring combined with the cross-sectional diameter of the bearing ring is less than the piston groove width when the pneumatic actuator piston is not within the actuator cylinder so that the compressible seal ring is not compressed between the actuator cylinder and piston groove bottom surface. On the other hand, the compressed cross-sectional diameter of the seal ring combined with the cross-sectional diameter of the bearing ring is equal to the piston groove width when the pneumatic actuator piston is compressed within the actuator cylinder such that the compressible seal ring and the bearing ring are restricted from side-to-side movement within the piston groove width of the piston groove as the pneumatic actuator piston reciprocates within the actuator cylinder.

Moreover, the compressible seal ring preferably has a circular uncompressed cross-section. This circular uncompressed seal ring cross-section has a first radius. The concave groove has a substantially circular arc-shaped groove with a second radius. In a presently preferred embodiment of the invention, the first radius is greater than the second radius.

In another aspect of the invention, the bearing ring has a cross-sectional profile with a chamferred corner on an opposite side of the bearing ring from bearing ring concave groove.

The method for using/making a seal bearing assembly for a compact actuator comprises providing a piston with a single piston groove for the seal bearing assembly. The use of only a single piston groove thereby controls the overall length of the piston. A compressible seal ring is provided that has a substantially circular cross-section when uncompressed. The substantially circular cross-section has a first radius. A bearing ring with a bearing groove along a first lateral side thereof is provided. The groove is substantially arc-shaped and has a second radius. In a preferred embodiment, the second radius is less than the first radius. The compressible seal ring is positioned within the single groove for the seal bearing assembly. The bearing is positioned within the single groove adjacent to the compressible seal ring such that the bearing groove along the first lateral side thereof directly faces the compressible seal ring.

Preferably, the compressible seal ring and the bearing ring are sized such that the compressible seal ring and the bearing ring are moveable within the single piston groove when the piston is outside of the compact actuator in which the piston reciprocates within a cylinder. However, the compressible seal ring and the bearing ring are preferably also sized such that the compressible seal ring and the bearing ring are fixed in position due to compression of the seal ring within the single piston groove when the piston is inside of the cylinder. Thus, with the piston inside the actuator cylinder, the compressible seal ring and the bearing ring are restricted from side-to-side movement within the single piston groove. Preferably a corner of the bearing ring is chamferred such that the bearing ring is chamferred on a second lateral side opposite from the first lateral side adjacent the bottom of the piston groove. As noted above, The bearing groove along a first lateral side thereof is preferably concave.

It is an object of the present invention to provide an improved pneumatic actuator assembly and method.

It is yet another object of the present invention to prevent wear of the actuatormoving components.

It is yet another preferred object of the present invention to provide a pneumatic actuator assembly seal bearing assembly that is very compact.

It is another preferred object of the present invention to provide a pneumatic actuator assembly with substantially concentrically aligned piston and actuator cylinder to prevent wear by metal-to-metal contact during heavy cycling of the actuator at full or substantially full loads.

A preferred feature of the present invention is a single groove in the piston that allows the piston length and actuator size to be kept very compact.

Another preferred feature of the present invention is a seal bearing assembly positioned within the same piston groove.

Yet another preferred feature of the present invention is a concave lateral surface on the bearing ring adjacent the compressible seal ring.

A preferred advantage of the present invention is a seal bearing assembly that can be inserted into presently existing pistons without modification to the piston or seal bearing assembly.

Another advantage of the present invention is significantly reduced maintenance costs when high cycling and high loading occur either intentionally or inadvertently.

Yet another advantage of the present invention is greater dependability of high load operation.

These and other objects, features, and advantages of the embodiments of the present invention will become apparent from the drawings, the descriptions given herein, and the appended claims. It will be noted that the above listed objects, features, and advantages are given for illustration and easier understanding of the invention only for the benefit the reader. The summary and listed objects, features, and advantages are in no manner intended to limit the invention in any manner. Therefore, reference to the claims, specification, drawings and any equivalents thereof is hereby made to more completely describe the invention. It is intended that all alternatives, modifications, and equivalents included within the spirit of the invention and as defined in the appended claims be encompassed as a part of the present invention.

While the present invention will be described in connection with presently preferred embodiments, it will be understood that it is not intended that the invention is limited to those particular embodiments but the descriptions given herein merely are to provide sufficient information such that one skilled in the art may practice one or more presently preferred embodiments of the invention, in accord with the patent statutes. Thus, the descriptions of the invention provided herein are not intended to limit the invention in any way. On the contrary, it is intended that all alternatives, modifications, and equivalents included within the spirit of the invention and as defined in the appended claims be encompassed as a part of the present invention.

DETAILED DESCRIPTION OF THE PREFERRED EMBODIMENTS

Figure 1:
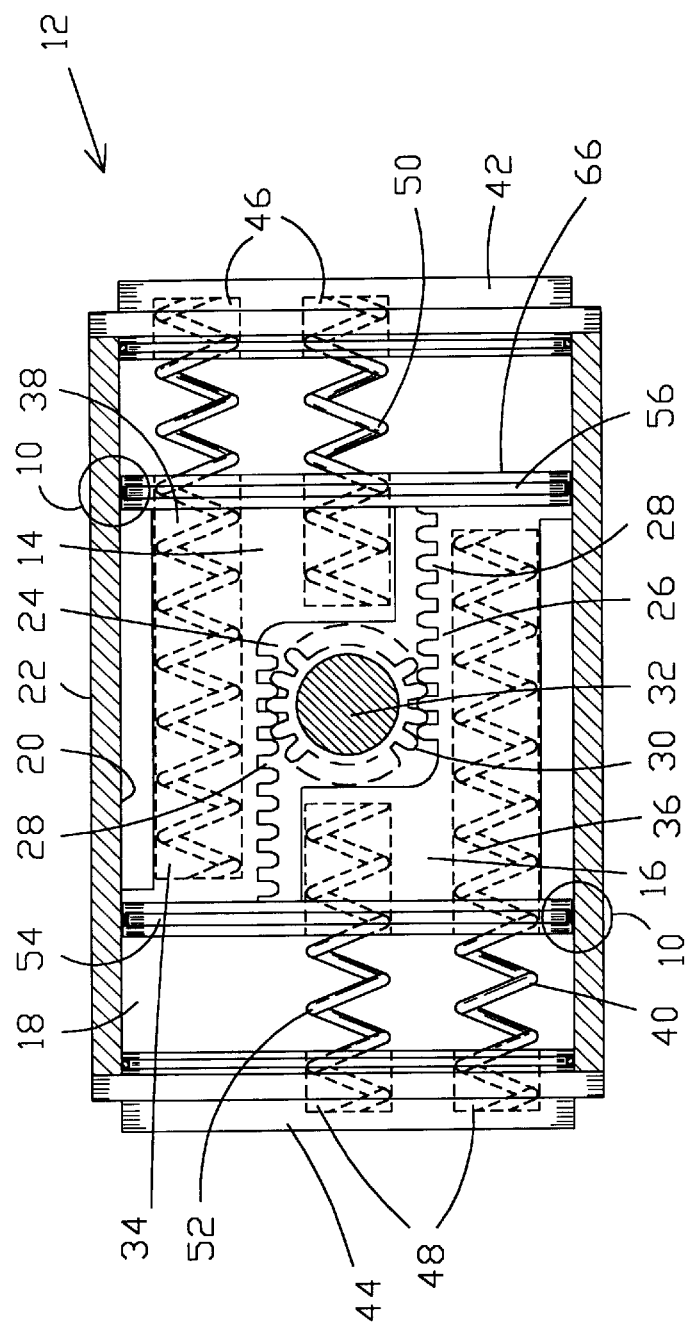
FIG. 1 is an elevational view, partially in section, of a compact pneumatic actuator in which the present invention is operable.

Referring now to the drawings, and more particularly to FIG. 1, there is shown pneumatic actuator 12, an exemplary pneumatic actuator referenced hereinbefore, in which the present invention is operable. Seal bearing 10, shown in more detail in FIG. 2–FIG. 4, may be used to increase the life of actuator 12 especially when actuator 12 must work at maximum or near maximum capacity over many operation cycles. Whether the situation of use at maximum capacity occurs by intentional design or inadvertently due to a failure in a system or valve in which the actuator is working, the present invention is designed to maintain the long life, minimal maintenance, and low cost manufacture of actuator 12. Seal bearing 10 may be used in presently existing actuators to replace the actuator piston O-ring seal without otherwise modifying the piston so that existing actuators may be upgraded where maximum capacity operation is anticipated, or simply as a precautionary measure to further increase overall system reliability. Thus, the advantages of the present invention adhere to the actuator, the corresponding valve operated by the actuator, and the overall system reliability. The present design allows replacement and upgrading as though a typical seal rather than an entire seal bearing assembly were being exchanged or upgraded.

Although the present invention could be used in other actuators, and other piston-cylinder applications, some background discussion of compact pneumatic actuator 12 is provided to show a particular advantageous application of the present invention. Actuator 12 typically includes two pistons 14 and 16 that move in opposite but parallel directions within actuator cylinder 18. Actuator cylinder 18 is defined by internal actuator internal surface 20 of cylinder housing 22. Each piston 14 and 16 has a corresponding axially extending rack 24 and 26 with teeth, such as rack teeth 28 for engaging pinion teeth 30 on valve operator 32. Rotation of valve operator 32 controls the opening and closing of a corresponding valve (not shown). Within axially extending racks 24 and 26 is an axially extending recess or aperture designated as 34 and 36, respectively. Inside axially extending apertures 34 and 36 springs 38 and 40, respectively, are provided that are used for effecting a return movement of the corresponding piston. Axially extending apertures 34 and 36 preferably extend substantially into corresponding racks 24 and 26 of the respective pistons through a distance of such length that is axially approximately up to or beyond a radial line perpendicular to the piston axis through the center of rotation of operating element 32 even when the piston is in a position in which the spring is compressed to its maximum. End caps 42 and 44 are preferably removeably and sealably secured to cylinder housing 22. Each end cap has additional recesses 46 and 48 for receiving springs 38 and 40 as well as relatively shorter return springs 50 and 52. As discussed in the description of U.S. Pat. No. 4,354,424, the difference in length of the springs provides additional advantages of actuator 12 such as a more constant and stronger return force that ensures the valve is moved to the end of its travel. Pneumatic air ports for controlling the actuator are provided as discussed in the aforementioned patent.

Figure 4:
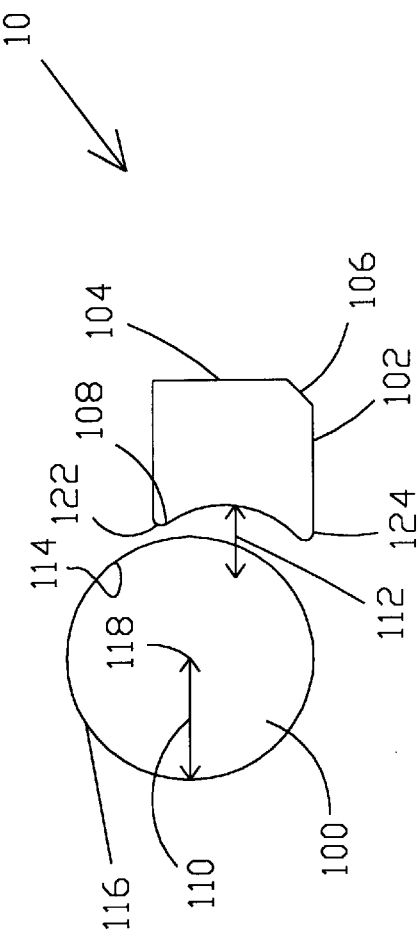
FIG. 4 is an enlarged diagrammatic view of a seal bearing assembly.
Figure 3:
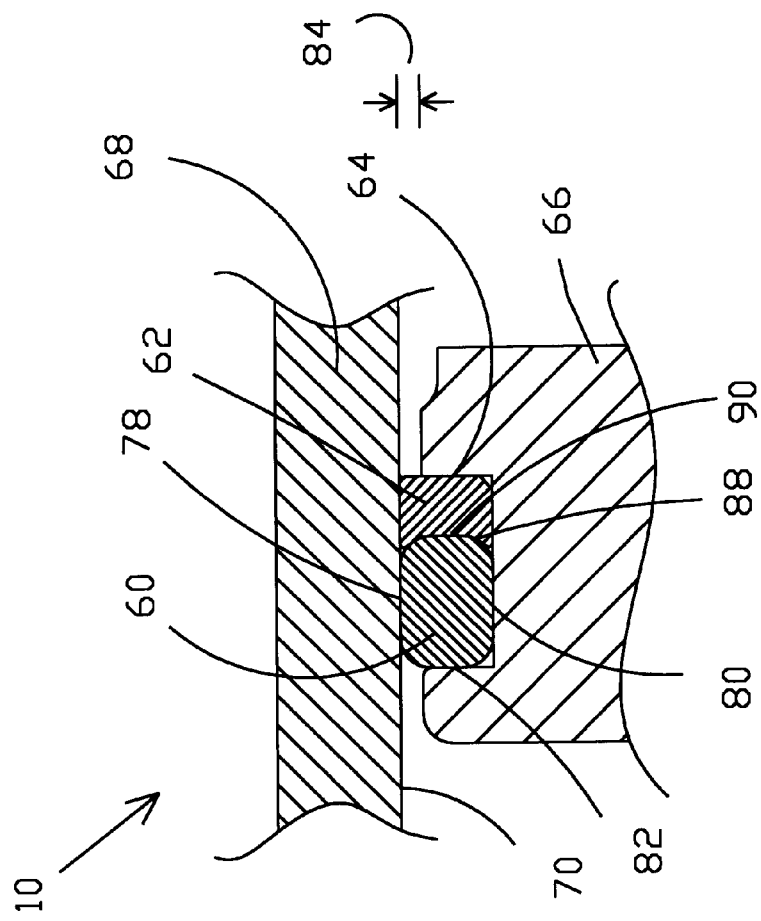
FIG. 3 is an elevational view, in section, of the seal bearing assembly of FIG. 2 after insertion of the actuator piston into the actuator cylinder.
Figure 2:
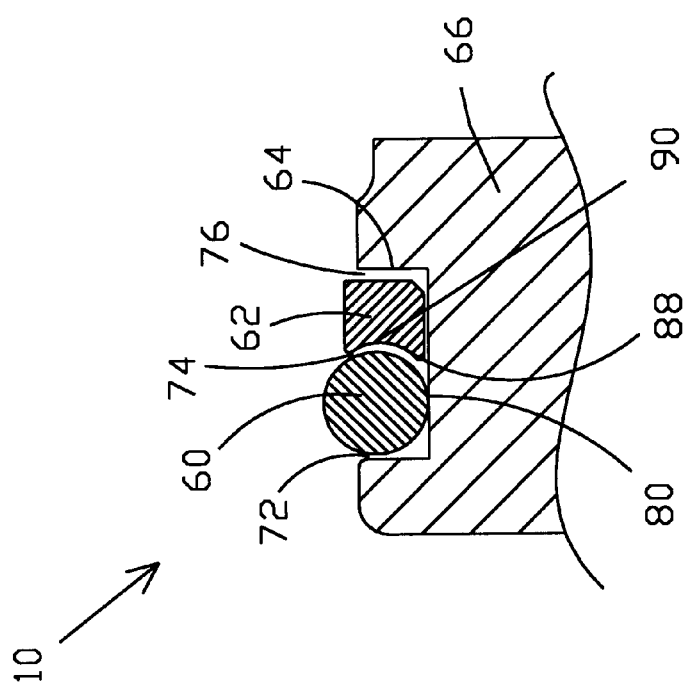
FIG. 2 is an elevational view, in section, showing a seal bearing assembly in accord with the present invention mounted on a piston of the actuator of FIG. 1 prior to insertion of the actuator piston into the actuator cylinder.

A substantial part of the peripheral surface of the piston racks 24 and 26 which provides a wear pad that abuts and guides against inner wall 20 of cylinder housing 22 is preferably made from POM (polly oxy methalyne) as from a high grade of Derin. However even with this coating when pneumatic actuator is operated at near or full load over numerous open and closing cycles, then some slight tilting of the pistons 14 and/or 16 may occur. FIGS. 2–4 show a cross-section of seal bearing assembly that solves this problem. It will be noted that pistons 14 and 16 have only one groove, 54 and 56 respectively, for sealing purposes. With only one groove, the overall length of the pistons is kept as short as possible. Thus, the use of a seal bearing assembly within the same piston groove is extremely usefull for a compact piston, such as for the actuator piston of the present invention.

FIG. 2 and FIG. 3 show one of the presently preferred embodiments of seal bearing assembly 10 of the present invention and some of the operation thereof. FIG. 2 and FIG. 3 show a cross-sectional view of compressible O-ring 60 that is typically formed of an elastomeric material and bearing ring 62 adjacent thereto within a piston groove such as 54 or 56 and hereby indicated as groove 64 within a piston such as piston 14 or 16 and hereby indicated as piston 66. Pneumatic actuator cylinder 68 may be like that of actuator cylinder housing 22 and defines actuator cylinder inner surface 70. It will be apparent that O-ring 60 in FIG. 2 is in a substantially uncompressed state as would be the case if piston 66 is not inserted into actuator housing 68. In FIG. 3, O-ring 60 is compressed as would occur when piston 66 is inserted into actuator housing 68.

It will be noted that in a preferred embodiment that when O-ring 60 is uncompressed as indicated of FIG. 2, seal bearing assembly 10 has room to move from side-to-side within the width of piston groove 64 due to space at 72, 74, and 76. The side-to-side movement thereby permitted when O-ring 60 is uncompressed would be generally in a direction parallel to movement of piston 66 within the actuator cylinder. On the other hand, when O-ring 60 is compressed by actuator housing 68 then the deformed O-ring 60 expands laterally to restrict any side-to-side movement. In the case of FIG. 3, a seal is formed along actuator cylinder inner surface 70 such as at surface 78 where O-ring 60 is deformed or flattened by the compression. O-ring 60 also seals within piston groove 64. Sealing may generally occur along piston groove bottom surface 80 and/or along wall 82. Piston groove 64 is shown with right angled surfaces but these may not be exact right angles and may be varied as desired. For instance, wall 82 may be offset from a right angle by a small angle such as about 5° or so as desired to effect optimal sealing/friction characteristics in that area as may be desired. Such variations may vary with the elasticity of O-ring 60 so as to effect desired operational specifications.

The diameter of O-ring 60 will be selected based on the diameter of bearing ring 62 and the width/depth of groove 64. Thus, various combinations of sizes of these elements/features may be used such that preferably the general result discussed above occurs. In other words, there is room for side-to-side movement of bearing seal assembly 10 within piston groove 64 when piston 66 is not within cylinder 68 as per FIG. 2. However such movement is severely limited, restricted, or prevented when piston 66 is placed within cylinder 68 as indicated in FIG. 3 where seal bearing 10 is restricted from side-to-side movement in the direction parallel to movement of piston 66.

Bearing ring 62 is formed of a substantially non-compressible generally non-elastomeric material and is preferably non-metallic. Bearing ring 62 may be formed of plastic such as acetyl or the like. Generally, sufficiently rigid materials that also reduce friction with metal cylinders can be used. Bearing ring 62 has a height between the bottom of piston groove 64 and actuator cylinder surface 70 sufficient to maintain offset 84 between piston 66 and actuator cylinder surface 70 so that metal-to-metal contact between piston 66 and surface 70 is eliminated. Bearing ring 62 also acts to produce a centralizing effect of piston 66 within actuator cylinder 68. When O-ring 60 is compressed as indicated in FIG. 3, then bearing ring 62 is pressed against groove wall 64 by expansion of O-ring 60 in a lateral direction.

Bearing ring 62 has a lateral side 88 that forms a concave groove 90 therein. As used herein concave generally refers to the type of surface found on the inside of a sphere, spheroid, hyperboloid, ellipsoid, arc, or generally internally oriented surface. On the other hand, convex describes a surface external to a sphere, spheroid, ellipsoid, hyperboloid or arc. Groove 90 in its entirety and/or portions thereof preferably has an arc portion and may be circular, hyperbolic, ellipsoidal, or the like. Groove 90 supports a corresponding convex surface of O-ring 60 when O-ring 60 is compressed as in FIG. 3. Compression of O-ring 60 causes expansion especially in the direction parallel to movement of piston 66 within piston groove 64.

In FIG. 4, diagrammatic view of compressible O-ring 100 and bearing 102 show additional features of seal bearing assembly 10 in accord with the present invention. It will be first noted that the relative size of O-ring 100 and bearing ring 102 are somewhat different than that of FIG. 2 and FIG. 3 as may be appropriate depending on the size/depth/width of piston groove 64 and relative size of O-ring 100 and bearing ring 102 as discussed earlier. The diameter of bearing ring 102 in a direction parallel to movement of the piston will affect the size of the selected O-ring 100. Bearing ring 100 preferably includes chamferred region 106 on lateral side 104 opposite from concave groove 108 that is positioned adjacent to compressible O-ring 100. Chamferred region 106 provides a better fit with piston groove wall such as groove wall 86.

Radius 110 describes a circular cross-section of O-ring 100 when O-ring 100 is uncompressed. Radius 112 that describes arc or groove 108 is preferably shorter than radius 110. This feature provides extra support for O-ring 100 because when O-ring 100 is compressed, the circumference in the region of 112 is distorted and is no longer round but is arc shaped as though described by a shorter radius such as that of radius 112. However, in a preferred embodiment radius 112 will be shorter than radius 110 of O-ring 100. In this way, it will describe a more supportive surface for O-ring 100. Without a suitable support surface that conforms to the shape of O-ring 100 after compression, and depending on the type of elastomeric/compressible material forming O-ring 100, O-ring 100 is subject to damage. Thus, concave groove 108 preferably provides a specially shaped support O-ring lateral side 114 that ensures a long life for O-ring 100. Preferably end pointed regions such as end region 122 and 124 on bearing ring 102 are rounded to protect O-ring 100 from damage.

Radius 110 preferably describes a substantially circular circumference 116 and extends from a center point 118 of O-ring 100. When compressed as can be seen in FIG. 3, O-ring 100 is compressed at its radial sides in the general direction as indicated by the arrows of radius line 110 and generally in the direction of movement parallel to the actuator piston. O-ring 100 is compressed between the actuator wall and the piston groove bottom so as to be substantially flattened in the direction transverse to movement of the piston 66. As discussed above, while radius 112 may be used to describe a circular arc, it may also be a radius from a focal point such as having an elliptical or hyperbolic arc, as desired. Point 120 may be a center point as though describing an arc of a circle for groove 108 or it may be a focal point such as that of an ellipse so that the length of radius 112 may vary when moved from being directed parallel to the motion of piston 66 as will be understood would appropriately describe an elliptical or hyperbolic portion or entirety of groove 108.

In operation, bearing seal assembly 10 provides that the actuator piston is centralized within the actuator cylinder to eliminate metal-to-metal contact therebetween. The compressible seal ring is compressed within the actuator cylinder to fix the bearing seal assembly in position within the piston groove. The bearing ring has a groove therein that provides support for the compressed O-ring.

The foregoing disclosure and description of the invention is illustrative and explanatory thereof, and it will appreciated by those skilled in the art, that various changes in the size, shape and materials as well as in the details of the illustrated construction or combinations of features of the various actuator elements may be made without departing from the spirit of the invention.

What is claimed is:

1. An assembly, comprising:
    a pneumatic actuator piston that is reciprocal within an actuator cylinder, said actuator cylinder having a cylinder surface, said pneumatic actuator piston defining therein a piston groove that encircles said pneumatic actuator piston, said piston groove having a piston groove width measured parallel to an axis of said pneumatic actuator piston, and a bottom groove surface such that said bottom groove surface is a side of said groove closest to said axis of said pneumatic actuator piston;
    rack teeth mounted on said pneumatic actuator piston;
    a rotary member with mating teeth thereon for engaging said rack teeth;
    a compressible seal ring for encircling said pneumatic actuator piston and being mountable within said piston groove, said compressible seal ring being sealingly engagable between said bottom groove surface and said cylinder surface; and
    a non-metallic substantially non-compressible bearing ring for encircling said pneumatic actuator piston, said bearing ring being sufficiently non-compressible to prevent contact between said cylinder surface and said pneumatic actuator piston as said rack teeth engage said mating teeth of said rotary member and thereby produce a force component on said pneumatic actuator piston transverse to said axis of said pneumatic actuator piston, said bearing ring being mountable within said piston groove adjacent said compressible seal ring, said bearing ring being sized to engage said bottom groove surface and said cylinder surface such that said bearing ring extends radially outwardly from said pneumatic actuator piston to thereby engage said cylinder surface and substantially center said pneumatic actuator piston within said actuator cylinder to prevent metal-to-metal contact between said pneumatic actuator piston and said cylinder surface, said bearing ring having a lateral support side engageable with said compressible seal ring, said lateral support side defining therein a bearing ring concave groove, said bearing ring and said compressible seal ring being separable with respect to each other so as to be separably mountable within said piston groove.

2. The assembly of claim 1, further comprising:
    said compressible seal ring having an uncompressed seal ring cross-sectional diameter wherein said seal ring cross-sectional diameter is measured substantially along the line parallel to the reciprocal movement of the pneumatic piston, said bearing ring having a bearing ring cross-sectional diameter wherein said bearing ring cross-sectional diameter is measured substantially along the line parallel to the reciprocal movement of the pneumatic piston, said uncompressed cross-sectional diameter of said seal ring combined with said cross-sectional diameter of said bearing ring being less than said piston groove width when said pneumatic actuator piston is not within said actuator cylinder such that said compressible seal ring is not compressed.

3. The assembly of claim 1, further comprising
    said compressible seal ring having a substantially circular uncompressed seal ring cross-section, said substantially circular uncompressed seal ring cross-section having a first radius, said bearing ring concave groove having an arc-shaped groove described with a second radius, said first radius being greater than said second radius.

4. The assembly of claim 1, further comprising:
    said bearing ring having a cross-sectional profile with a chamfered corner on an opposite side of said bearing ring from said bearing ring concave groove, said chamfered corner being positioned adjacent said bottom groove surface.

5. The assembly of claim 1, further comprising:
    said compressible seal ring having a compressed seal ring cross-sectional diameter, said bearing ring having a bearing ring cross-sectional diameter, said compressed cross-sectional diameter of said seal ring combined with said cross-sectional diameter of said bearing ring being expanded to said piston groove width when said pneumatic actuator piston is within said actuator cylinder such that said compressible seal ring is compressed so that said compressible seal ring and said bearing ring are restricted from side-to-side movement in a direction parallel to said axis of said pneumatic actuator piston within said piston groove, said bearing ring concave groove having a profile that substantially mates to an outline of said compressible seal ring formed after said compressible seal ring is compressed between said cylinder surface and said bottom groove surface.

6. An assembly, comprising:

a pneumatic piston that is reciprocal within a cylinder, said cylinder having a cylinder surface, said pneumatic piston defining therein a piston groove that encircles said pneumatic piston, said piston groove having a piston groove width and a bottom groove surface such that said bottom groove surface is a side of said groove closest to an axis of said pneumatic actuator piston;

an elastomeric seal ring for encircling said pneumatic piston and being mountable within said piston groove, said elastomeric seal ring being sealingly engagable between said bottom groove surface and said cylinder surface, said elastomeric seal ring having a compressed seal ring cross-sectional diameter when said pneumatic piston is disposed within said cylinder wherein said diameter is measured substantially along a line parallel to said reciprocal movement of said pneumatic piston, said elastomeric seal ring having an uncompressed seal ring cross-sectional diameter when said pneumatic piston is not disposed within said cylinder wherein said diameter is measured substantially along said line parallel to said reciprocal movement of said pneumatic piston, said uncompressed seal ring cross-sectional diameter being less than said compressed seal ring cross-sectional diameter along said line parallel to said reciprocal movement;

a substantially non-compressible bearing ring for encircling said pneumatic piston, said bearing ring being mountable within said piston groove adjacent said elastomeric seal ring, said bearing ring being sized to engage said bottom groove surface and said cylinder surface such that said bearing ring extends radially outwardly from said pneumatic piston to thereby engage said cylinder surface and substantially center said pneumatic piston within said cylinder to prevent metal-to-metal contact between said pneumatic piston and said cylinder surface, said bearing ring having a bearing ring cross-sectional diameter wherein said diameter is measured substantially along said line parallel to said reciprocal movement of said pneumatic piston, said uncompressed cross-sectional diameter of said seal ring combined with said cross-sectional diameter of said bearing ring being less than said piston groove width when said pneumatic piston is not disposed within said cylinder such that said seal ring and said bearing ring are moveable from side-to-side in a direction parallel to said axis of said pneumatic actuator piston within said piston groove width when said pneumatic piston is not within said cylinder, said compressed cross-sectional diameter of said seal ring combined with said cross-sectional diameter of said bearing ring being expanded to said piston groove width when said pneumatic piston is within said cylinder such that said elastomeric seal ring is compressed and said elastomeric seal ring and said bearing ring are restricted from side-to-side movement within said piston groove.

7. The assembly of claim 6, further comprising:

said bearing ring having a lateral support side engageable with said elastomeric seal ring, said lateral support side defining therein a bearing ring support groove, said bearing ring support groove having a profile that substantially mates to an outline of said elastomeric seal ring formed after said elastomeric seal ring is compressed between said cylinder surface and said bottom groove surface.

8. The assembly of claim 6, further comprising:

said bearing ring having a lateral support side engageable with said elastomeric seal ring, said lateral support side defining therein a concave groove.

9. The assembly of claim 6, further comprising:

said bearing ring having a cross-sectional profile with a chamfered corner on an opposite side of said bearing ring from a bearing ring support groove.

10. The assembly of claim 7, further comprising said elastomeric seal ring having a circular uncompressed seal ring cross-section, said circular uncompressed seal ring cross-section being defined by a first radius, said bearing ring support groove having an arc-shape defined by a second radius, said first radius being greater than said second radius.

11. A method for a seal bearing assembly for use within an actuator, comprising:

providing a piston with a single piston groove for said seal bearing assembly;

providing a compressible seal ring having a substantially circular cross-section when uncompressed, said substantially circular cross-section having a first radius;

providing a bearing ring with a bearing groove along a first lateral side thereof, said bearing groove being substantially arc-shaped and having a second radius less than said first radius;

positioning said compressible seal ring within said single piston groove for said seal bearing assembly; and positioning said bearing ring within said single piston groove adjacent to said compressible seal ring such that said bearing groove along said first lateral side thereof directly faces said compressible seal ring.

12. The method of claim 11, further comprising:

said compressible seal ring and said bearing ring being moveable within said single piston groove when said piston is outside of said actuator in which said piston reciprocates within a cylinder.

13. The method of claim 12, further comprising:

said compressible seal ring and said bearing ring being fixed in position due to compression of said seal ring within said single piston groove when said piston is inside of said cylinder so that said compressible seal ring and said bearing ring are restricted from side-to-side movement in a direction parallel to said axis of said pneumatic actuator piston within said single piston groove.

14. The method of claim 11, further comprising:

chamfering a corner of said bearing ring.

15. The method of claim 14, further comprising:

chamfering said corner of said bearing ring on a second lateral side opposite from said first lateral side.

16. The method of claim 15, further comprising:

chamfering said corner of said bearing ring adjacent to a bottom of said single piston groove.

17. The method of claim 11, further comprising:

providing that said bearing groove along said first lateral side of said bearing ring is concave.

\* \* \* \* \*